United States Patent [19]

Lutrat

[11] Patent Number: 4,538,486

[45] Date of Patent: Sep. 3, 1985

[54] NON-SLIP SCREW

[76] Inventor: Jacques Lutrat, 58, Rue de Lorraine, 21200 Beaune, France

[21] Appl. No.: 554,140

[22] Filed: Nov. 21, 1983

[30] Foreign Application Priority Data

Nov. 22, 1982 [FR] France .................. 82 19637

[51] Int. Cl.³ .............................................. B25B 23/00
[52] U.S. Cl. ....................................... 81/460; 411/407
[58] Field of Search ............... 411/407, 402, 403, 406, 411/408; 81/460, 451

[56] References Cited

U.S. PATENT DOCUMENTS

| 38,141 | 4/1863 | Ayres. | |
|---|---|---|---|
| 132,946 | 11/1872 | Armstrong | 411/406 |
| 1,056,095 | 3/1913 | Groos | 411/406 X |
| 2,631,624 | 3/1953 | Wright. | |
| 2,684,094 | 7/1954 | Lissy | 411/407 X |
| 2,792,039 | 5/1957 | Wing | 411/407 X |
| 3,540,342 | 11/1970 | Vaughn | 411/407 |
| 3,695,321 | 10/1972 | Garehime | 411/403 X |
| 4,311,071 | 1/1982 | Bassell | 81/451 X |

FOREIGN PATENT DOCUMENTS

| 22718 | of 1909 | United Kingdom | 411/403 |
| 2037925 | 7/1980 | United Kingdom | 81/460 |

Primary Examiner—Gary L. Smith
Assistant Examiner—Adrian H. Whitcomb, Jr.
Attorney, Agent, or Firm—David H. Semmes; Warren E. Olsen

[57] ABSTRACT

A non-slip screw of the type having a threaded shank and a slotted head, including a locking surface defined in the screw head by a central transverse slot which extends across the top of the head for engagement with a screwdriver blade tip. The locking surface includes a pair of radially outwardly extending inclined walls extending downwardly from each end of the transverse slot. An especial screwdriver having its exterior blade tip configured complementally with the pairs of radially outwardly extending inclined walls is engageable with the locking surface, so as to rotate the screw head in either direction. The screw head is characterized by its positive grip with the screwdriver blade tip, notwithstanding actual screwdriving or unscrewing and removal of the screw.

1 Claim, 12 Drawing Figures

NON-SLIP SCREW

BACKGROUND OF THE INVENTION (1) Field of the Invention

Threaded screws, particularly screws having a modified head, such that the screwdriver blade "locks" into the head during screwdriving and removal of the screw.

DESCRIPTION OF THE PRIOR ART

LISSY: 2,684,094
GREAT BRITAIN: 22,718 (Edmunds) 1910
Being discussed in a separate PRIOR ART STATEMENT.

(2) Summary of the Invention

According to the present invention, a screw having a conventional threaded shank is modified, such that the transverse slot extending through the head of the screw is provided with a locking surface. The locking surface is defined by opposed pairs of downwardly extending walls at each end of the slot, said walls being inclined away from the longitudinal axis of the screw shank. The screwdriver blade is modified such that its exterior tip has outwardly extending inclined walls, complementally engagable with the inclined walls of the screw head locking surface. The result is a screw which will not slip from the screwdriver during screwdriving, may be unscrewed without applying pressure and, indeed, may be assisted by tractional forces during unscrewing.

DESCRIPTION OF THE PREFERRED EMBODIMENT

Figure 1:
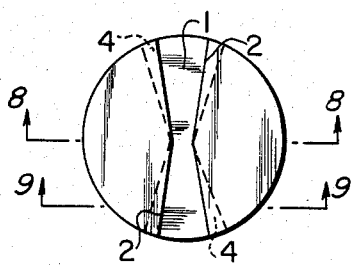
FIG. 1 is a top plan view of the modified screw head, partially in phantom, showing the locking surface in the form of opposed pairs of "pie slices".

The present invention provides threaded screw heads with a modified locking surface. The modified head includes a transverse slot or groove 1 having a pie slice shape 2, larger towards the periphery of the head than in the center and with downwardly extending walls in the form of a recess or inset 4. The corresponding screwdriver has a blade tip 5, the two faces of which present from the center outwards four complemental beveled projections 6, the angles corresponding complementally to the angles of inset 4.

In use of the non-slipping screwdriver blade for extracting screws, as described, the beveled projections 6 of the screwdriver blade engage recesses or insets 4 of the screw head and thereby prevent the screw head from slipping. Therefore, it is no longer essential to strongly press upon the screw when screwdriving and it is possible to unscrew by actually applying some traction upon the screw.

Conventional screws either with a simple transverse slot in the screw head or with a cruciform groove have the inconvenience that it is necessary both in screwdriving or unscrewing to press strongly upon the screw head. This is logical only in a few cases, for example, in driving a wood screw, but it is not so logical in screwdriving a bolt and it is absolutely not rational when trying to remove or unscrew a wood screw or a Parker screw which is strongly affixed. It is then necessary to press contrarily to the desired movement. This very often brings along useless efforts and the damaging of the screw head with the result that the screwdriver slips.

Figure 5:
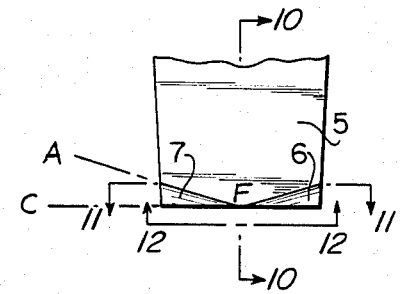
FIG. 5 is a fragmentary enlarged side elevation of the screwdriver blade tip.
Figure 12:
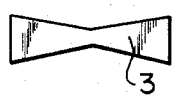
FIG. 12 is a bottom plan of the screwdriver blade tip, showing the opposed pie slice configuration.

Accordingly, the head of the present screw has been modified. Instead of a conventional slot with parallel edges, groove 1 of conventional width in the center of the screw head is widened towards the periphery of the head according to FIG. 1. It means that each one of the ends 2 of the slot will appear as two straight half-sections or pie slices extending radially from the center of the screw head. The edges of the diametrically opposed half-sections of the screw head are parallel. The inner configuration of groove 1 will correspond complementally to the exterior of face 3 of the blade tip, as illustrated in (FIGS. 5 and 12). This configuration permits complemental engagement of the screwdriver blade tip 5 and the screw head groove 1.

Figure 2:
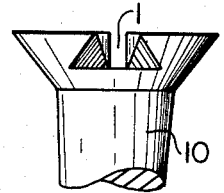
FIG. 2 is a side elevation of a flat head screw, embodying the present invention.
Figure 3:
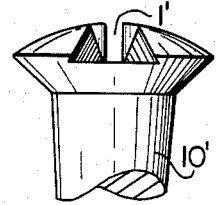
FIG. 3 is a side elevation of a beveled head screw, embodying the present invention.
Figure 4:
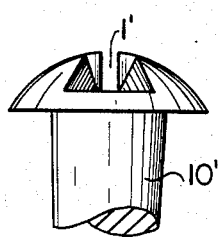
FIG. 4 is a side elevation of a half round head screw, embodying the present invention.

Furthermore, the wall of groove 1 of the screw head will show an angular bias that regularly enlarges towards the outside of the head, creating four similarly slanting recesses or insets 4. This configuration is available for screws having a flat head (FIGS. 1 and 2), a half round head as illustrated in FIG. 4, a beveled head as illustrated in FIG. 3, or the like.

Figure 6:
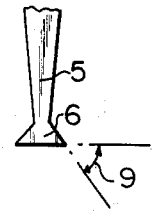
FIG. 6 is a fragmentary side elevation of the screwdriver blade tip, showing the exterior outwardly inclined locking walls engagable with the locking surface of the screw head.
Figure 7:
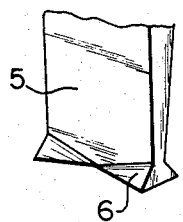
FIG. 7 is a fragmentary perspective of the screwdriver blade tip.
Figure 8:
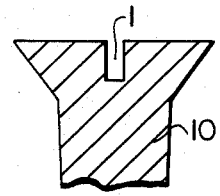
FIG. 8 is a fragmentary section, taken along section line 8—8 of FIG. 1 and showing the transverse slot in the screw head.
Figure 9:
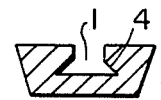
FIG. 9 is a fragmentary perspective taken along section line 9—9 of FIG. 1 and showing the pair of downwardly extending walls outwardly inclined away from the axis of the shank.
Figure 10:
FIG. 10 is a fragmentary section, taken along section line 10—10 of FIG. 5.
Figure 11:
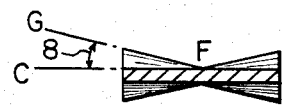
FIG. 11 is a transverse section of the screwdriver blade tip taken along section line 11—11 of FIG. 5 and showing the opposed pie slice configuration of the blade tip.

The screwdriver engaging special groove 1 will consist of blade 5, the end of which will not only present two simply flat faces; blade 5 will also include upon its two faces and from the center of each face four identical beveled projections 6, as illustrated in FIGS. 5, 6 and 7. Blade projections 6 are characterized by two angles: i.e., the angle AFC 7 as illustrated in FIG. 5 and the angle GFC 8, as illustrated in FIG. 11. These angles 7 and 8 will themselves determine angle 9 which appears on the side face of the end of the screwdrive blade 5, as illustrated in FIG. 6. The exterior end of the screwdriver blade 5 will thus appear as shown in FIG. 7.

It is essential that any manufacturer of these types of screws and screwdrivers adopt standard values for the angles 7 and 8; for instance 15 for both which then would give a value of 45 for the angle 9, regardless of the diameter of the screw head or the width of screwdriver blade 5.

From the moment when a screwdriver of the above-described type is applied to the head of a screw 10 having the special groove 1 and, as soon as the head is rotated to either direction, the screwdriver will strongly engage the screw because the blade tip beveled projections 6 will fit complementally within inset 4 with a triple advantage:

(i) centering of the screw head—no possibility to slip either laterally or vertically, (ii) a greater facility to unscrew and remove a screw, because of the fact that no pressure will be necessary, and (iii) even on the contrary the possibility of applying some traction upon the screw.

It may also be noted that the modified screws, according to the present invention, will permit screwing or unscrewing with conventional screwdrivers having a simple, flat-faced blade, but of course without any of the above described advantages.

The manufacturing of the grooves of the extractable screw heads being more elaborate than the one of the presently existing conventional screws, it will result in a possibly somewhat higher cost of production, but this should be balanced by the facility arising from it.

I claim:

1. The combination of a screwdriver and screw including:
   a. a screwdriver having a blade tip with outwardly extending inclined edges in diametrically opposed pie slice configuration; and
   b. a threaded screw having a slotted head, including a locking surface in the form of diametrically opposed pairs of pie slices, said opposed pairs of pie slices being defined by a central transverse slot extending diametrically from one side of the screwhead to the other and at each end of said slot a pair of radially outwardly extending walls, inclined downwardly and outwardly from said transverse slot, so as to be complementally engagable with the screwdriver blade tip opposed pie slice configuration exterior, as defined by said outwardly extending inclined edges.

* * * * *